United States Patent Office 3,269,827
Patented August 30, 1966

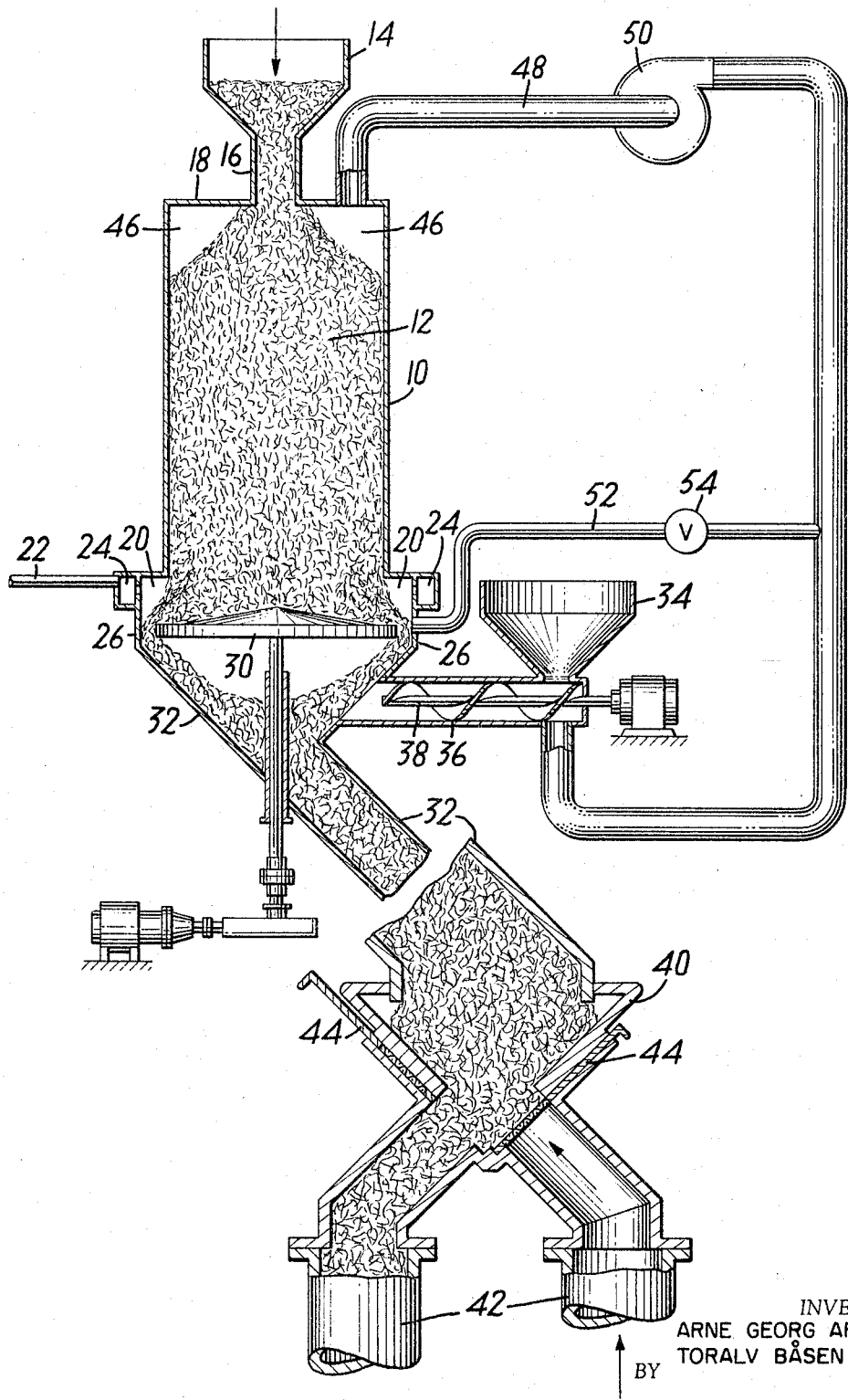

3,269,827
PROCESS FOR PREHEATING THE CHARGE TO AN ELECTRIC SMELTING FURNACE
Arne Georg Arnesen and Toralv Båsen, Vagsbygd, pr. Kristiansand S., Norway, assignors to Elektrokemisk A/S., Oslo, Norway, a corporation of Norway
Filed Mar. 5, 1963, Ser. No. 263,041
Claims priority, application Norway, Mar. 8, 1962, 143,561
7 Claims. (Cl. 75—11)

Many attempts have been made to utilize the reaction gas generated in an electric smelting furnace for preheating or prereducing the charge but these have not proven entirely satisfactory because the process is difficult to control and the efficiency is low.

In the known processes, hot reaction gas from the electric furnace must for practical reasons be cleaned before it is used for preheating the charge to the furnace. Such practice requires large and expensive gas cleaning plants and the gas when cleaned is of necessity cooled with an accompanying loss of sensible heat. This materially reduces the efficiency of the process because the sensible heat of furnace reaction gas at 850° C. constitutes about 20% of the total available heat content of the gas.

After the furnace reaction gas is cleaned it is fed into a chamber where combustion takes place in the presence of air and such additional fuel as may be necessary for preheating the charge. Combustion of the cleaned reaction gases must be very carefully controlled to establish the proper balance to provide hot combustion gas substantially free of oxygen. If the hot combustion gas supplied to the preheating shaft contains oxygen, the oxygen will upon contact with the charge tend to react with solid carbonaceous reducing agent in the charge and thereby upset the carbon to oxygen balance required for reduction in the furnace. This may make it necessary to use an excess of carbon in the charge.

As a practical matter it is extremely difficult to control combustion of the furnace reaction gas so as to produce hot combustion gas free of oxygen. The electric furnace does not consistently supply a uniform quantity of reaction gases and when the supply is reduced as by hanging or bridges formed in the furnace there is excess air in the combustion chamber which tends to result in an oxidizing gas that will use up carbon in the charge.

Another drawback to the known process is that the charge to a pig iron furnace can not be preheated substantially above a temperature of about 750° C. If the charge is preheated above 750° C., carbon dioxide which is always present in the hot combustion gas will tend to consume the solid carbonaceous reducing agent in the charge. The temperature of the hot combustion gas is therefore limited to about 750 to 900° C. An example of the above described preheating and prereduction process is illustrated in U.S. Patent No. 3,033,673.

In accordance with the present invention, the drawbacks of the known preheating processes of loss of carbon and poor heat economy are overcome by preheating the charge with hot combustion gas before the solid carbonaceous reducing agent is added. Since the hot combustion gas does not come into contact with the solid carbonaceous reducing agent there is no need to carefully control combustion of the furnace reaction gas and an excess of air may be used without danger of consuming carbon in the charge. Temperatures above those used in the known processes may be employed for preheating the carbon free charge and the temperature is only limited by the sintering temperature of the ore.

The temperature of the hot combustion gas may therefore range up to about 1000 to 1400° C. At this high temperature the gas leaving the preheating shaft will have a temperature of about 200 to 300° C. These off gases contain enough sensible heat to be useful and the off gases may be used with advantage to dry and preheat the solid carbonaceous reducing agent before it is mixed with the preheated charge. At such low temperatures oxygen in the combustion gas will not consume the carbon necessary for reduction of the charge to the electric furnace.

The preheating process of the present invention is most efficiently carried out by combustion of furnace reaction gas in a preheating shaft having an annular combustion chamber therein that surrounds the charge. The furnace reaction gas is fed into the annular space of the combustion chamber and combustion of the reaction gas is carried out by injecting air and possibly additional fuel into the chamber. The air is preferably directed tangentially into the annular chamber along the walls where it tends to prevent the deposit of furnace dust which might otherwise build up and clog the annular space of the combustion chamber. The hot combustion gas leaving the annular combustion space moves upwardly through the shaft to preheat the carbon free charge which descends down through the shaft and into the electric smelting furnace. The solid carbonaceous reducing agent required for reduction of the charge is mixed with the preheated charge in an area below the annular combustion chamber either by introducing the solid reducing agent into the preheating shaft adjacent the discharge outlet or by introducing the reducing agent directly into the electric furnace along with the charge.

In a preferred form of the invention a baffle member is positioned in the shaft adjacent the lower portion of the combustion chamber. In this form of the invention, the baffle member is used with advantage for directing the furnace reaction gas into the annular space of the combustion chamber and the baffle member may also be employed for controlling the rate of flow of charge down through the shaft. The baffle member may be a conventional type of discharge table which may either be a rotating table or a stationary table equipped with rotating scrapers for discharging the charge from the preheating shaft into a chute which feeds the preheated charge into the furnace.

In the preferred form of invention a plurality of chutes are employed for feeding the preheated charge from the shaft into the furnace. A distributing device directs the charge into some of the chutes while the furnace reaction gases are withdrawn from the furnace through that or those chutes which do not contain charge. The charge is periodically directed into different chutes so that the descending charge will clean the chutes of furnace dust and tars deposited by the furnace reaction gases. This results in a self cleaning system which eliminates the need for an expensive gas cleaning plant and it conserves the valuable sensible heat of the furnace reaction gas.

Further details of the process of the present invention may be readily understood in connection with the description of a preferred form of apparatus for carrying out the process which is illustrated in the accompanying drawing in which:

The figure is a schematic illustration of a section through a shaft used for preheating the charge to an electric furnace.

In the drawing 10 illustrates a preheating shaft which is preferably equipped with a refractory lining (not shown). The charge 12 which is to be reduced in the electric smelting furnace (not shown) consists of the desired raw material free of solid carbonaceous reducing agent. The charge may be in any desired form such as lump ore, sinter, pellets, briquettes, etc. and it may consist of any desired raw material such as metal oxides, metal alloys, carbides etc. The selected carbon free charge is fed into a hopper 14 where it descends into the preheating shaft through a pipe 16 positioned in the top wall 18 of the shaft. In the lower portion of the shaft an annular space 20 is provided which surrounds the charge. Air for the combustion of reaction gas (later described) from the electric smelting furnace is injected into the space as by means of a pipe 22 and an annular channel 24 which distributes air into the combustion space preferably by means of spaced apertures (not shown) which are arranged to direct the air in a tangential stream against wall section 26 of the preheating shaft which forms one wall of the combustion space. The stream of air tends to prevent the build up of furnace dust on wall 26 which could result in clogging the annular combustion space.

The annular combustion space or chamber 20 illustrated in the drawing is formed by enlarging the inside diameter of the preheating shaft in the area of wall section 26. A baffle member for directing the furnace reaction gas into the annular combustion space and for controlling the descent of the charge in the preheating shaft such as the rotating discharge table 30 is provided and preferably the table is positioned adjacent the bottom of the annular combustion space 20. With this construction the charge will form a frusto-conical shaped heap on the discharge table and the sloping sides of the heap of charge forms a porous interior wall for the annular combustion space which lies between the porous wall of the charge and the wall of the preheating shaft. The rotating discharge table illustrated in the drawings is conventional equipment well known in the art and as is known the table may rotate or it can remain stationary in which case rotating scraper blades are provided for moving the charge.

As illustrated in the drawings the charge descends from the discharge table into a pipe 32 and the solid carbonaceous reducing agent is fed into the pipe in an area below the combustion space 20. Any convenient form of apparatus may be used for this purpose such as hopper 34 and a pipe 36 equipped with a screw conveyor 38 which feeds the solid reducing agent into the charge. The charge which now contains the desired amount of solid reducing agent is fed into the electric smelting furnace where it is reduced in known manner.

In the structure shown in the drawings the charge is fed by pipe 32 into a distributing device such as the hopper 40 which is connected to a plurality of pipes 42 that feed the charge into the furnace. Each of the pipes 42 is provided with a slide valve 44 positioned adjacent the wall of the hopper. The slide valves 44 are porous and may conveniently be made of wire screening with interstices small enough to prevent charge from passing through the screen. As illustrated in the drawing the slide valve in one or more of the pipes is opened for feeding charge into the furnace while the slide valve in another pipe or pipes is closed so that reaction gas generated in the furnace will flow upwardly through the empty pipe and through the charge into the combustion space 20. The descending charge is periodically rotated among the feed pipes 42 so that the charge will clean the pipes of furnace dust deposited in the pipes by the furnace reaction gas. It will be understood that pipe 32 ordinarily will not be filled with charge but if the pipe is filled with charge as illustrated in the drawing the furnace reaction gas will still pass up through the charge and furnace dust in the gas will tend to deposit on the charge particles and be carried back down into the furnace.

The hot furnace reaction gas as it flows up through the charge is directed into the annular combustion space 20 by the rotating discharge table 30 where combustion of the gas takes place in the presence of air supplied by the pipe 22. Thereafter the hot combustion gas passes through the porous wall of the charge and the gas moves upwardly in the shaft to preheat the descending charge. The hot combustion gas collects in the annular space 46 which is formed in the top of the shaft by introducing charge into the shaft by means of the pipe 16 which occupies only a limited portion of the area of top wall of the shaft. The gas is withdrawn through a pipe 48 which is preferably provided with an exhaust fan or blower 50. The pressure in the annular gas collecting space 46 will be slightly below atmospheric pressure during operation and if pipe 16 is kept full of charge, the charge will tend to provide a seal so that combustion gas will not leave the shaft through pipe 16 and air will not enter the shaft through the pipe.

The combustion gas withdrawn from the shaft through pipe 48 may be used for drying and preheating the solid carbonaceous reducing agent. This may be done for example by connecting pipe 48 to the bottom of hopper 34 as illustrated in the drawing. A portion of the gas may also be recycled back into the combustion chamber by means of a pipe 52 with a suitable valve 54 to control the amount of recycle gas and the temperature in the combustion chamber 20. If desired the hot combustion gas may be removed from the top of the preheating shaft in the manner described in U.S. Patent No. 3,033,673.

The preheating system of the present invention may be used to preheat the raw materials employed in the production of metals, metal alloys, carbide, phosphorus and the like. It can also be utilized for the calcination of materials which contain carbonates or chemically combined water and it may be used in the roasting of magnetite, sulphurous ores etc.

It will be understood that it is intended to cover all changes and modifications of the preferred embodiment of the invention herein chosen for the purpose of illustration which do not constitute departures from the spirit and scope of the invention.

We claim:

1. The method of preheating the charge to an electric smelting furnace in a preheating shaft of the type having an annular combustion space that surrounds the charge therein and communicates directly with interiorly exposed surface portions of the charge in said shaft which comprises the steps of feeding a solid particulate charge free of solid carbonaceous reducing agent into the top of the shaft, supplying furnace reaction gas into the annular combustion space, combusting the gas in such space to produce hot combustion gas adjacent said interiorly exposed surface portions of the charge and passing said hot combustion gas into said interiorly exposed surface portions and upwardly through the descending charge in the shaft to preheat the charge.

2. The method specified in claim 1 which includes the step of passing the reaction gas directly from the furnace through a portion of the charge before feeding the gas into the combustion space.

3. The method specified in claim 1 which includes the step of mixing solid carbonaceous reducing agent with the preheated charge in an area below the combustion space.

4. The method specified in claim 1 which includes the steps of withdrawing the combustion gas from the shaft after the gas has passed through the descending charge therein, and then feeding the gas through solid carbonaceous reducing agent to dry and preheat the reducing agent.

5. The method specified in claim 4 in which a portion of the combustion gas withdrawn from the shaft is fed into the combustion space to control the temperature of the hot combustion gas generated in such space.

6. The method of preheating the charge to an electric smelting furnace in a preheating shaft of the type in which the shaft has an annular combustion space that surrounds the charge therein and communicates directly with interiorly exposed surface portions of the charge in said shaft, and in which the discharge end of the shaft is connected to the furnace by means of a plurality of feed pipes which comprises the steps of feeding a solid particulate charge free of solid carbonaceous reducing agent into the top of the shaft, conveying through said pipes preheated charge to the furnace in successive sequences utilizing fewer than all of said pipes in each sequence so that furnace reaction gas may rise through said pipes and enter the combustion space, combusting the furnace reaction gases in said space to produce hot combustion gas adjacent said interiorly exposed surface portions of the charge and passing said hot combustion gas into said interiorly exposed surface portions and upwardly through the descending charge in the shaft to preheat the charge.

7. The method specified in claim 6 in which only one pipe is used in each sequence of conveying.

References Cited by the Examiner

UNITED STATES PATENTS

| | | | |
|---|---|---|---|
| 772,354 | 10/1904 | Harmet | 13—33 XR |
| 826,742 | 7/1906 | Price | 13—33 XR |
| 996,492 | 6/1911 | Lorentzen | 13—33 XR |
| 1,177,680 | 4/1916 | Brown | 263—30 XR |
| 1,440,546 | 1/1923 | Langenberg et al. | 263—39 XR |
| 1,725,763 | 8/1929 | Mount et al. | 263—29 |
| 2,515,764 | 7/1950 | Driscoll | 13—33 XR |
| 2,978,315 | 4/1961 | Schenck et al. | 75—11 |

DAVID L. RECK, *Primary Examiner.*

JOHN J. CAMBY, *Examiner.*

H. F. SAITO, *Assistant Examiner.*